Jan. 12, 1926.  1,569,547
J. W. KAUFFMANN
HOP PACKAGE CUTTER
Filed Jan. 18, 1923   5 Sheets-Sheet 1
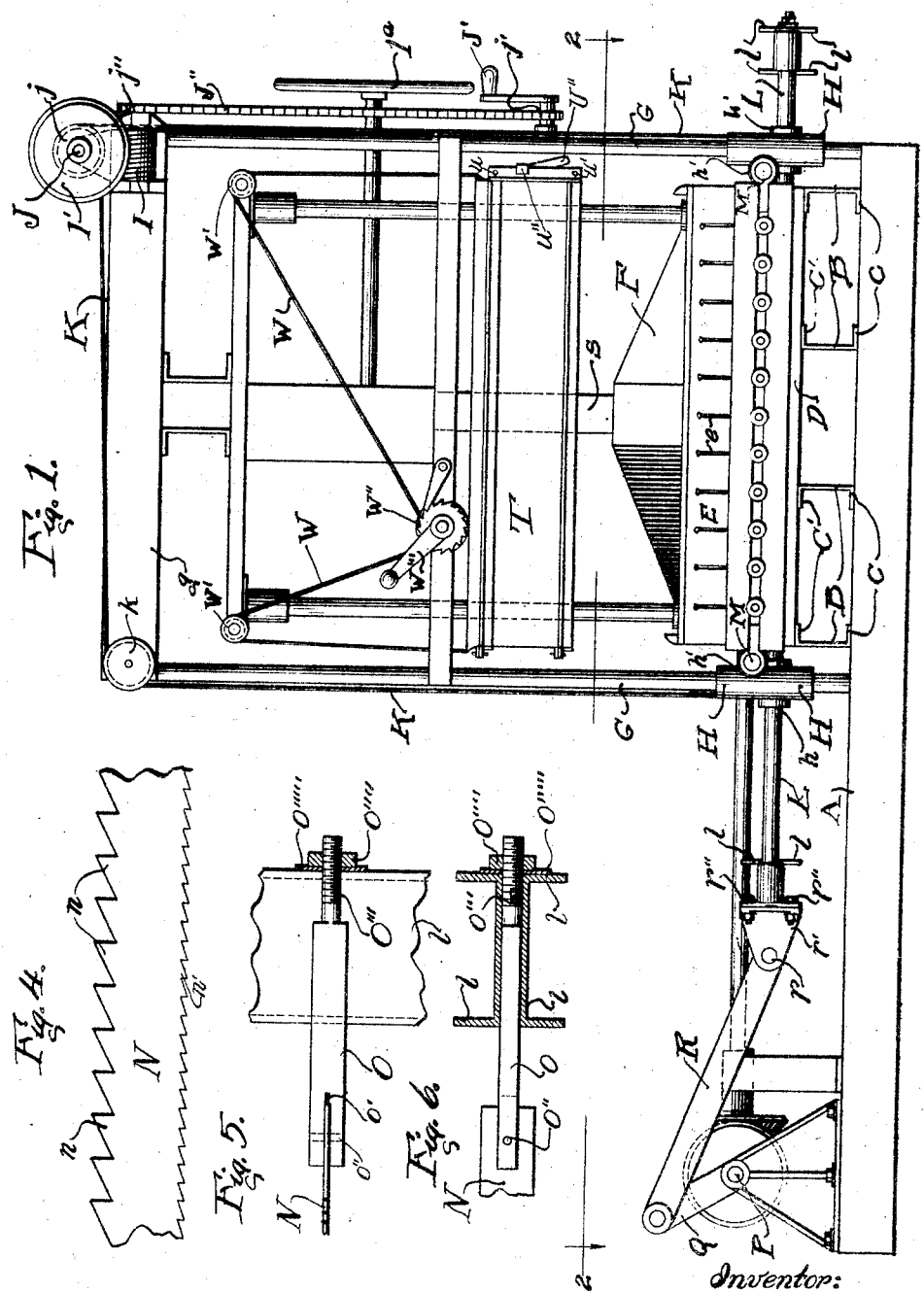
Witness,
Inventor:
John W. Kauffmann.
By Charles Turner Brown,
Att'y.

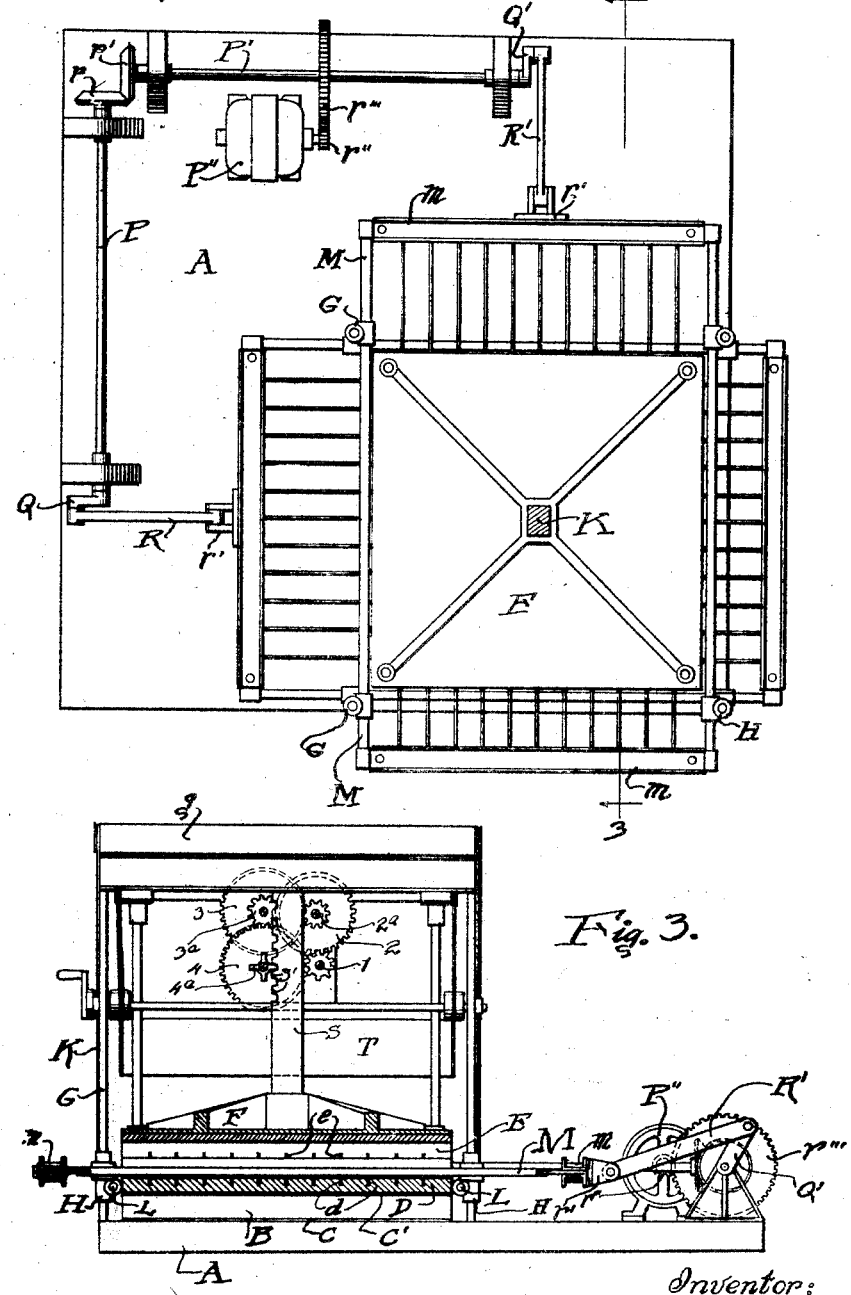

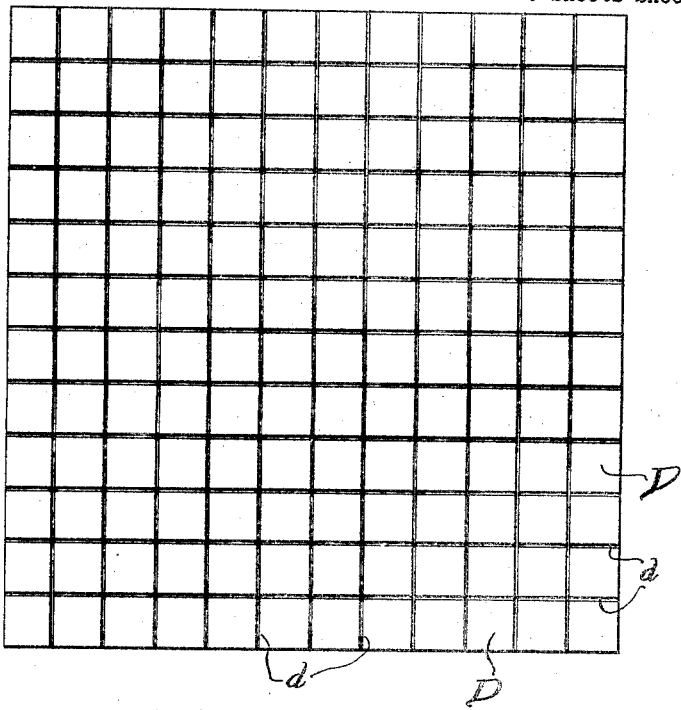
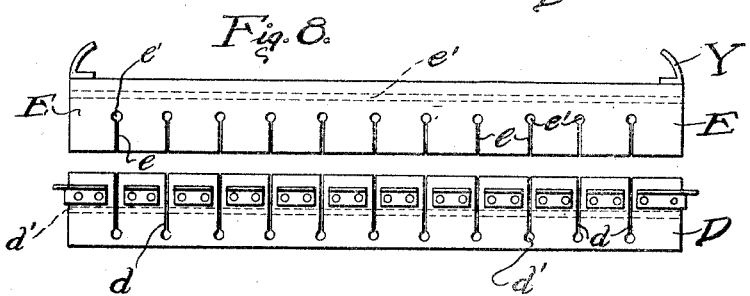
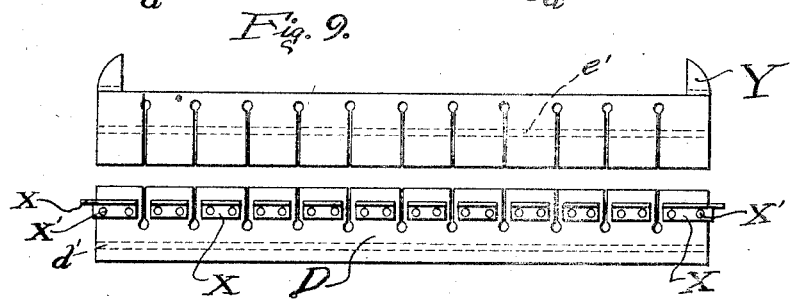

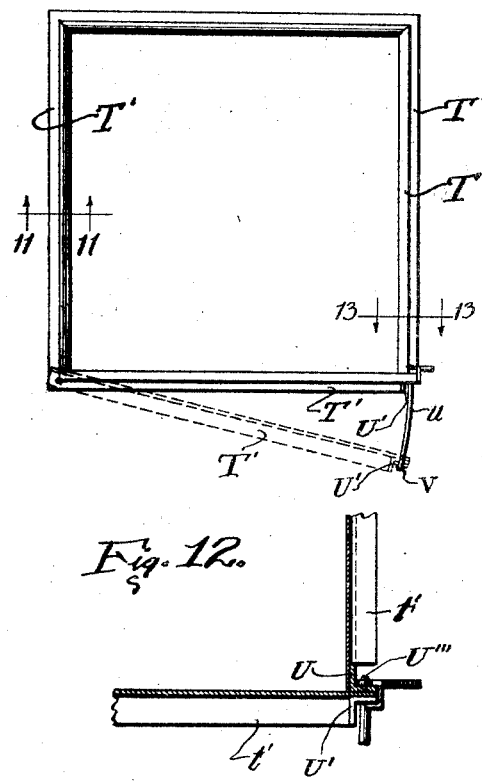
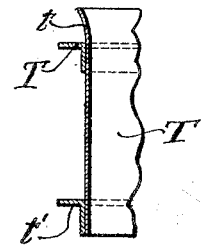
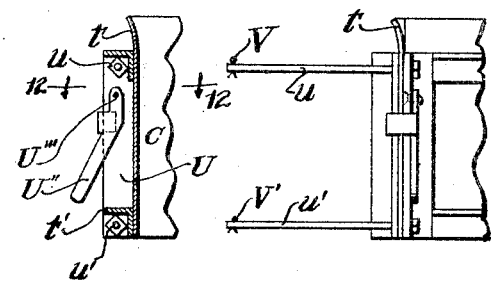
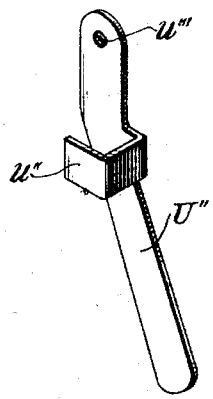

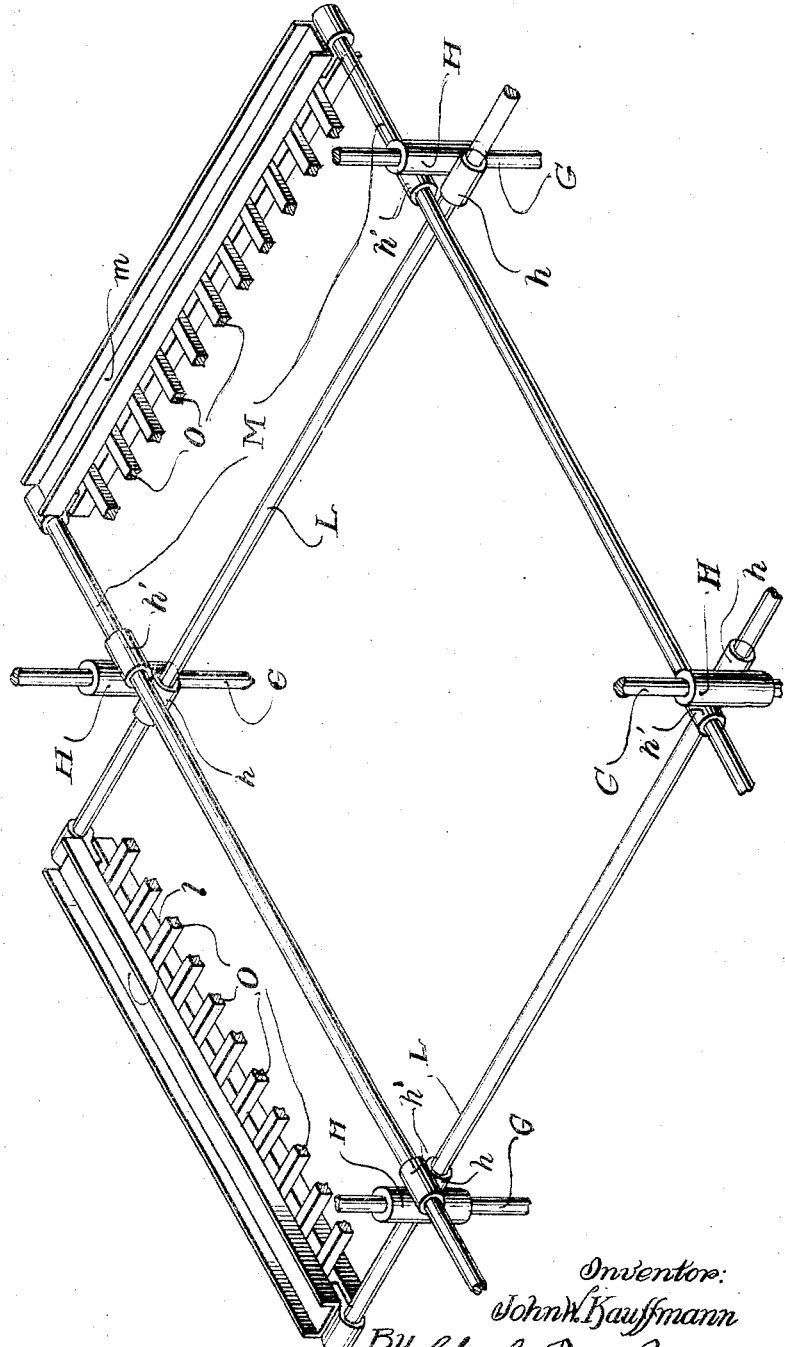

Patented Jan. 12, 1926.

1,569,547

UNITED STATES PATENT OFFICE.

JOHN W. KAUFFMANN, OF CHICAGO, ILLINOIS.

HOP-PACKAGE CUTTER.

Application filed January 18, 1923. Serial No. 613,416.

*To all whom it may concern:*

Be it known that I, JOHN W. KAUFFMANN, a citizen of the United States, and a resident of Chicago, in the county of Cook and State of Illinois, have invented certain new and useful Improvements in a Hop-Package Cutter, of which the following, when taken in connection with the drawings accompanying and forming a part hereof, is a full and complete specification.

This invention relates to a machine for cutting hops in shape to be deposited in cartons, to make small packages of hops in a pressed condition.
Among the objects of this invention is to obtain a machine by means of which a large number of compressed packages may be simultaneously pressed and cut, in shape and of a size to be readily placed in suitably sized cartons; and an additional object is to obtain said packages without injury or over pressing of the hops therein; an additional object is to obtain a machine for the purpose named which is not liable to break or get out of order; which is easily understood and operated; and which can be readily arranged to press and cut different sized packages. Additional objects are disclosed in the description and claims of this specification.

In the drawings referred to Fig. 1 is a side elevation of a machine embodying the invention.

Fig. 2 is a horizontal section on line 2—2 of Fig. 1, viewed as indicated by arrows.

Fig. 3 is a side elevation of the machine at an angle of ninety degrees from the elevation illustrated in Fig. 1, with the several parts in the same position as in Fig. 1.
Fig. 4 is a side elevation of a portion of one of the saws of the machine.

Fig. 5 is a top plan view of one end of one of the saws of the machine, with a portion of the associated parts by means of which the saws are made taut in the frame therefor.

Fig. 6 is a side elevation of the end of the saw illustrated in Fig. 5, and the portion of the associated parts which are illustrated in Fig. 5.
Fig. 7 is a bottom plan view of the upper one of the presser boards of the machine. The top plan view of the lower one of the presser boards of the machine is a duplicate of the bottom plan view of the upper one of said presser boards.

Fig. 8 is a side elevation of the presser boards of the machine, and

Fig. 9 is a side elevation of said presser boards at an angle of ninety degrees from the sides illustrated in Fig. 8.

Fig. 10 is a top plan view of a bottomless hopper forming a member of the machine.

Fig. 11 is a vertical section of the hopper, on line 11—11 of Fig. 10, viewed as indicated by arrows.

Fig. 12 is a horizontal section of one corner of the hopper, on line 12—12 of Fig. 13, viewed as indicated by arrows.

Fig. 13 is a vertical section of the corner illustrated in Fig. 12, on line 13—13 of Fig. 10, viewed as indicated by arrows.

Fig. 14 is a side elevation of the corner illustrated in Fig. 13, viewed at an angle of ninety degrees therefrom.

Fig. 15 is a perspective of the latch which forms an element of the construction illustrated in Figs. 10 to 14, both inclusive.

And Fig. 16 is an isometric showing portions of the horizontally movable saw frames, the saws being removed to better disclose the relative levels of the planes in which said frames move, and showing the journal bearings of said frames.

A reference character applied to designate a given part indicates said part throughout the several figures of the drawings wherever the same appears.

A represents the base of the machine. B, B, represent channel bars mounted on base A, with flanges C, C, thereof resting on said base. D represents a presser board, which rests on flanges C', C' of channel bars B, B. E represents a presser board which is substantially a duplicate of presser board D, and is secured on its upper side to base F of pressure applying mechanism hereinafter described. The presser boards D and E are preferably made of wood, and are respectively provided with the parallel cuts, or slits $d$, $d$ and $e$, $e$, which extend from the opposed faces of said presser boards to the apertures $d'$, $d'$ and $e'$, $e'$, (Figs. 8 and 9). G, G represent vertical standards which are respectively secured at their lower ends in a frame comprising, also, top members $g$, $g$, (Figs. 1 and 3). H, H, represent bearings which are vertically movable on standards G, G. I represents a rotatably mounted worm wheel which is provided with teeth arranged to intermesh with the teeth of wheel I'.

Wheel I' is rigidly secured on rotatable shaft J, and j, (Fig. 1,) indicates a drum which is rigidly secured on shaft J. J', Fig. 1, represents a handle the hub whereof is provided with a sprocket wheel j', which is rigidly secured thereto; and J'' represents a sprocket chain which extends over the sprocket wheels j' and j''. The sprocket wheel j'' is rigidly secured to the shaft of the worm wheel I, so that the turning of the crank J' turns said worm wheel, and by means of the intermeshing teeth on wheel I also turns wheel I'. K, K, represent cables which are, respectively, secured to the several bearings H, H, and to the drum j. k, Fig. 1, represents a rotatably mounted wheel at the left hand ends of members g, g, as viewed in said figure, over which the cables K, K, which are attached to the bearings H, H, at said left hand side of said figure, extend. The vertical movement of bearings H, H, is controlled by said cables K, K, and said cables are wound on and unwound from drums j, j, by manipulation of handle J', as before described. L, L, represent rods which form the sides of a saw frame, and said rods are longitudinally movable in journal bearings h, h, in bearings H, H. l, l, represent channel irons, between two of which at each end of rods L, L, said rods are secured, said channel irons forming the ends of the saw frame L l. M, M, represent rods which form the sides of an additional saw frame, and m, m, represent additional channel irons, to two of which at each end of said rods M, M, the rods are secured to form the saw frame M m. The rods M, M, are longitudinally movable in additional journal bearings (h', h'), on bearings H, H.

It will be observed by reference to Figs. 1, 3 and 16, that the saw frame comprising rods L, L, and channel irons l, l, is in a plane at a lower level than is the saw frame which comprises the rods M, M, and channel irons m, m.

The above recited relative planes in which the saw frames are movable, are maintained by the journal bearings h, h, and h', h', being rigidly mounted on, and preferably integral with, the bearings H, H.

In the machine illustrated a like number of saws, N, N, (eleven of them), are secured in each of the saw frames described; and the manner in which each of said saws are made taut is illustrated in Figs. 5 and 6, in which figures O represents a rectangular bar, with a slot O' at one end thereof, in which slot one end of saw N may be inserted, and held in place by pin O''. The end of bar O opposite to slot O' is made circular in cross section, as at O''', and provided with screw threads corresponding with the internal screw threads in nut O'''', permitting said nut to turn thereon. O''''' represents a washer which is placed on the screw threaded end of bar O and interposed between the nut O'''' and channel irons l, l. For reasons hereinafter recited I place teeth n, n, on the upper edges of the several saws N, N, and the teeth n', n', of smaller size, on the lower edges of said saws, (see Fig. 4).

P, P' represent shafts which are rotatably mounted at right angles to each other in bearings secured to base A, and p, p' represent bevel gear teeth on said shafts which are arranged to intermesh. P'' represents a motor, and p'' and p''' respectively represent intermeshing gear teeth. The gear wheel or pinion which is provided with teeth p'' is rigidly secured on the shaft of motor P'', and the wheel which is provided with teeth p''' is rigidly secured on shaft P', and said shaft P' is therefore rotated by the motor P'', and shaft P is rotated by shaft P', (by means of the intermeshing bevel gear teeth p and p'), said shafts rotating at the same rate of speed. Q represents a crank on shaft P, and Q' a crank on shaft P'. R represents a pitman which is pivotally mounted at one end on crank Q, and at the other end on pivot r, in bearing r'. Bearing r' is secured to the channel irons l, l, at one end of the frame comprising channel irons l, l, and rods L, L, by the bolts r'', r''. R' represents a pitman, one end of which is mounted on crank Q', and the other end is pivotally mounted in a like bearing r', which is secured to the channel irons m, m, at one end of the saw frame comprising channel irons m, m, and bars M, M.

Rotation of the shafts P, P', causes corresponding rotation of cranks Q, Q', and the rotation of said cranks produces rectilinear movement of said saw frames, in paths of travel which are at right angles to each other, and the several saws in said frames are arranged to travel in the slits d, d, and e, e, respectively. The saw frame comprising rods L, L, and channel bars l, l, being in a lower plane than is the saw frame comprising the rods M, M, and channel bars m, m, the several saws in the first named frame are in a lower plane than are the saws in the last named frame, and for this reason I make the slits d, d, in presser board D in which the saws in the frame comprising rods L, L, and channel bars l, l, travel, to extend lower thereinto than the slits d, d, in said presser board D which are at right angles to the above named slits, and in which the saws in the frame comprising the rods M, M, and channels bars m, m, travel, as is indicated by broken lines d', d', Figs. 8 and 9; and for the same reason slits e, e, in the upper presser board E, extending in one direction therethrough do not extend so deeply in said board as do the slits at right angles thereto, the broken lines e', Fig. 8, representing the aperture through the block to which the parallel cuts forming slits $e$, $e$, extend in the direction at right angles to the cuts or slits illustrated in said figure; and in Fig. 9, the broken lines $e'$ indicate the depth to which the saw cuts $e$, $e$, illustrated in full lines in Fig. 8, extend, relative to the slits illustrated by full lines in said Fig. 9.

S represents a standard which is rigidly secured at its lower end to frame F. Standard S is provided with teeth $S'$, $S'$, adjacent to the upper end thereof, and 1, 2, $2^a$, 3, $3^a$, 4, and $4^a$, represent reducing gear mechanism, the pinion $4^a$ whereof meshes with gear teeth $S'$, $S'$, of standard S. The shaft of gear pinion 1 is provided with a hand wheel $1^a$, which is rigidly secured to said shaft, and by means of which the standard S, base F, and presser board E are raised and lowered; and when lowered into the bottomless hopper T, about to be described, on the hops contained in said hopper, pressure may be applied to said hops. The hopper T comprises four vertical sides, which are respectively flared outward, as at $t$, $t$, on the upper edges thereof, and are provided with angle irons $T'$, $T'$, adjacent to said outwardly flared edges, and the angle irons $t'$, $t'$, adjacent to the lower edges of said sides; said angle irons being placed on said sides to prevent the giving or buckling thereof when the presser board E is forced down on to hops contained in said hopper. The lower one of the sides of hopper T, as viewed in Fig. 10, is not permanently attached at the right hand end thereof, to the end adjacent thereto of the vertical right hand side of said hopper, said ends being latched together when said lower side is in the position illustrated in full lines in said Fig. 10; and when unlatched said last named (lower) side may assume the position indicated by broken lines in said Fig. 10. The latching means referred to comprise vertically mounted angle irons U, $U'$, which are secured to the ends of the right hand one of the vertical sides, (as illustrated in Fig. 10), and to the adjacent end of the lower side in said Fig. 10. Said latching mechanism also comprises the rods $u$, $u'$, which are firmly secured in the angle irons U, and which extend through apertures provided therefor in angle iron $U'$, said rods $u$, $u'$, fitting loosely in said apertures. Said latching mechanism also comprises the lever $U''$, having the abutment $u''$ thereon, as is well illustrated in Fig. 15. Lever $U''$ is pivotally mounted on angle iron U, by pivot $U'''$, which extends through aperture $u'''$ of lever $U''$ and through a corresponding aperture in angle iron U. When the several sides of hopper T are in the position illustrated by full lines in Fig. 10, the lever $U''$ may be forced into the position illustrated in Figs. 10, 12 and 13, and at said time the abutment $u''$ extends over one flange of the angle iron $U'$, and retains said side in said position. The rods $u$, $u'$ are respectively provided with cotter pins V, $V'$, adjacent to the ends thereof, said rods and cotter pins limiting the opening movement of the sides to the hopper, as is indicated by broken lines in Fig. 10. And said rods, when said sides are closed, and latched, as above recited, prevent either lateral or longitudinal relative movement of the ends of the sides which are latched together. W, W, represent cables which are, respectively, attached to the corners of hopper T, said cables extending upward and over the rollers $W'$, $W'$, and to the roll $W''$. $W'''$ represents a crank handle by means of which roll $W''$ is turned to wind cables W, W, thereonto, and to unwind said cables therefrom. The vertical position of said hopper is therefore controlled by said cables and crank handle.

X, X, represent angle iron members which are secured to presser board D, as by screws or bolts $X'$, $X'$, to form rests on which the lower edges of hopper T rest and by which said hopper is supported, when said hopper is closed and in position to be loaded with hops.

It will be noted that the means for manually controlling the vertical position of the presser board E and the hopper T, respectively, may have substituted therefor power driven mechanism, where quicker operation of said members of the machine is desired than can be manually obtained.

The operation of the machine is as follows: Presser board E is raised and hopper T is lowered; said hopper resting on the angle irons X, X, and said presser board being raised sufficiently high to permit the placing of material in said hopper. A cardboard of proper size to fit closely to the sides of the hopper is then placed in said hopper, a determined quantity of hops, by weight, is then placed in the hopper on said cardboard, and evenly distributed. An additional cardboard fitting closely to the sides of said hopper is then placed in the hopper and on said hops. The reducing mechanism controlling the position of standard S, is then actuated, and said standard, together with base F and presser board E is lowered, said presser board extending into the hopper T, and on to the upper cardboard on the hops therein, and the required pressure to give the desired compression to said hops is applied. Said hops being sufficiently compressed the latch comprising lever $U''$ is unlocked, said latch being moved pivotally to release abutment $u''$ from the flange of angle iron $U'$, and thereby the sides of said hopper are so far released from contact with the compressed hops that said hopper may be raised vertically above the presser board E. The saw frames comprising rods L, L, and channel irons *l, l*, and rods M, M, and channel irons *m, m*, are respectively set in motion, as by motor P'', and a suitable upward movement given to bearings H, H, by the several cables attached thereto and associated mechanisms hereinbefore recited, and saws N, N, in said frames will cut through, first the lower cardboard on the presser board D, and thereafter the compressed hops and upper cardboard. Said saws, with said saw frames at the limit of their upward movement, being, or substantially so, in the slits *e, e*, of the presser board E. The movement of the travel of said saw frames is then reversed, to travel downward, the longitudinal movement of the saw frames being continued, and any hops which, by the compression obtained by presser board E, which are forced into the kerfs made by the several saws as the saw frames move upward are, on the descent of said frames, cut by the saw teeth on the lower edges of the saws. The downward movement of the saw frames, and also the rectilineal movement thereof are continued, until said saws are all contained in the slits *d, d*, of the lower presser board D, when said movements are stopped. The presser board E is then raised, so that access may be had to the several packages of hops obtained by the above recited cutting action of the saws. The machine illustrated shows eleven saws N, N, in each of the saw frames, and thereby I obtain one hundred and forty four packages of hops, (one gross), each package having a card board thereunder, and one thereover, and these packages are removed from the lower presser board D, and are placed, together with said card boards, in a suitably sized carton. After all the packages are removed from the presser board D, the above described operation may be repeated.

It will be noted, that by placing the card boards in hopper T, below and above the hops therein, before applying pressure thereto, said hops do not have access to the slits *d, d, e, e*, in presser boards D and E, and that when the packages are cut as recited, said card boards afford means to handle the several packages without breaking or otherwise injuring the appearance of said packages, before the same are properly inserted in the cartons provided therefor; and I find that a uniform appearance and weight is obtained in said packages.

To make sure that the presser board E will in its upward movement enter the hopper T, said hopper being in a raised position and said presser board is moved upward thereinto, I secure the angle irons Y, Y, on the upper corners of said presser board E, see Figs. 8 and 9.

I claim:

1. Longitudinally movable saw frames mounted in different horizontal planes, means to reciprocate and means to vertically move said frames, saws mounted in said frames, in combination with presser boards respectively provided with slits corresponding with and adapted to receive said saws.

2. Longitudinally movable saw frames mounted in different horizontal planes, means to reciprocate and means to vertically move said frames, saws provided with teeth on the upper and lower edges thereof mounted in said frames, in combination with presser boards respectively provided with slits corresponding with and adapted to receive said saws.

3. Longitudinally movable saw frames mounted in different horizontal planes, means comprising rotatably mounted shafts positioned at right angles to each other and provided with cranks and pitmen connecting said cranks to said frames, to reciprocate said frames, and means to vertically move said frames, in combination with presser boards respectively provided with slits corresponding with and adapted to receive said saws.

4. Longitudinally movable saw frames mounted in different horizontal planes, means to reciprocate said frames, and means, comprising cables attached to the bearings in which the sides of said frames move, to move said frames vertically, and saws mounted in said frames, in combination with presser boards respectively provided with slits corresponding with and adapted to receive said saws, and vertically movable bearings adapted to hold the sides of said frames and permit longitudinal movement thereof.

5. A base, vertical rods on said base, bearings movable on said rods and means to control the vertical position of said bearings, horizontal journals in said bearings, a plurality of said journals in a horizontal plane and a plurality thereof in a different horizontal plane, saw frames the sides whereof are movable in said journals, said frames arranged to reciprocate at right angles to each other, means to reciprocate said frames, and saws in said frames, in combination with presser boards respectively provided with slits corresponding with and adapted to receive said saws.

6. Longitudinally movable saw frames mounted in different horizontal planes, means to reciprocate and means to vertically move said frames, saws mounted in said frames, and a hopper, in combination with presser boards respectively provided with slits corresponding with and adapted to receive said saws, and abutments on the lower one of said presser boards said hopper adapted to rest thereon and be supported thereby, and means to force the upper one of said presser boards down to apply pressure on the contents of said hopper positioned between said presser boards.

7. A base, vertical rods mounted on said base, bearings mounted on said rods and means to control the vertical position of said bearings, horizontal journals in said bearings, a plurality of said journals in a horizontal plane and a plurality thereof in a different horizontal plane, saw frames the sides whereof are movable in said journals, said frames arranged to reciprocate at right angles to each other, means to reciprocate said frames and saws in said frames, in combination with presser boards respectively provided with slits corresponding with and adapted to receive said saws, a hopper, abutments on the lower one of said presser boards, said hopper adapted to rest thereon and be supported thereby, and means to force the upper one of said presser boards down to apply pressure on the contents of said hopper positioned between said presser boards.

8. A base, vertical rods on said base and a frame mounted on the upper ends of said rods, bearings on said rods, means mounted on said frame to control the vertical position of said bearings, horizontal journals on said bearings, a plurality of said journals in a horizontal plane and a plurality thereof in a different horizontal plane, saw frames movable in said journals, said frames arranged to reciprocate at right angles to each other, means to reciprocate said frames, and saws mounted in said frames, in combination with presser boards respectively provided with slits corresponding with and adapted to receive said saws, a hopper, means mounted on said frame to force the upper one of said presser boards down to apply pressure on the contents of said hopper positioned between said presser boards, and to move said presser board up a determined distance, and abutments on said lower presser board arranged to permit the lower edge of said hopper to rest on and be supported thereby, and means to force the upper one of said presser boards down to apply pressure on the contents of said hopper positioned between said presser boards.

9. Presser boards respectively provided with parallel slits arranged to register, the upper one of said presser boards movable relative to the lower one, in combination with cutting blades corresponding in number with said slits, and movable in said slits, and means to raise and lower said cutting blades to separate material between said presser boards and form a plurality of units of said material.

10. Presser boards respectively provided with oppositely positioned slits extending inwardly from the opposed faces of said presser boards, and provided with additional oppositely positioned slits also extending inwardly from the opposed faces of said presser boards at right angles to said first named slits, in combination with cutting blades movable in said slits, and means to raise and lower said cutting blades to separate material between said presser boards and form a plurality of units of said material.

JOHN W. KAUFFMANN.